Oct. 16, 1934.  S. D. WILSON  1,977,258

GREASE COLLECTING ATTACHMENT FOR COOKING RANGES

Filed Aug. 15, 1932

Inventor
Stuart D. Wilson
By Clarence A. O'Brien
Attorney

Patented Oct. 16, 1934

1,977,258

UNITED STATES PATENT OFFICE 1,977,258

GREASE COLLECTING ATTACHMENT FOR COOKING RANGES

Stuart D. Wilson, Spokane, Wash.

Application August 15, 1932, Serial No. 628,938

1 Claim. (Cl. 126—211)

This invention relates to an attachment for a cooking range, the general object of the invention being to provide a double trough which is adapted to be suitably connected with a part of the range so that grease and the like collecting on that part of the top portion which is used for cooking meats and other articles can be scraped from the said top part into either trough, thus providing means whereby the grease which has but little value can be separated from grease of greater value.

This invention also consists in other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
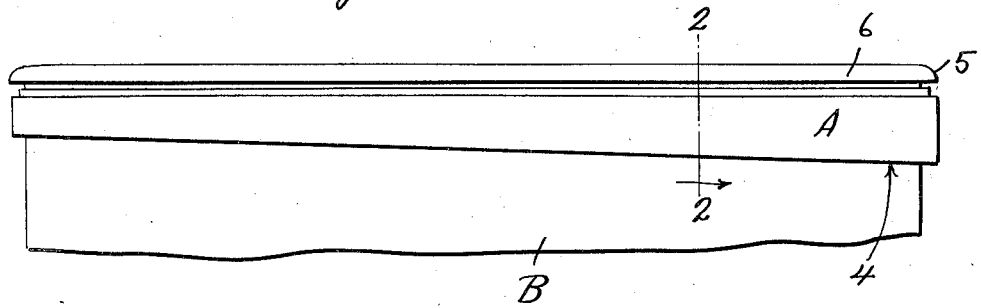
Figure 1 is a fragmentary elevation of a cooking range showing the invention in use.

As is well known, certain portions of the top part of a cooking range are used for cooking meats and other articles without the use of cooking utensils, particularly in restaurants and that the grease remaining on such top part is scraped into a trough at the front edge of the range. This grease has different values. For instance grease composed of miscellaneous oils and fats has no value other than for soap-making purposes, whereas grease from the cooking of ham and bacon, for instance, has a greater value but with the single trough now in use there is no way to separate the grease of greater value from that of less value.

It is therefore the object of my invention to provide means whereby the grease of greater value can be separated from that of less value, and in carrying out my invention I provide a double trough A which is composed of a substantially channel-shaped member having a partition 1 longitudinally arranged therein which divides the member into the troughs 2 and 3. The partition is of less height than the sides of the member. The bottom portion of the two troughs slope downwardly from one end of the device to the other so that said other end is of greater depth than the first end as shown at 4 in Fig. 1. This end acts as a receptacle for collecting the grease.

The device is attached to one side, preferably the front side of the range B under, or partly under the overhanging projecting portion 5 of the top part 6 of the range. An elongated substantially inverted Y-shaped member 7 has its fork fitting over the partition as clearly shown in Fig. 2, and this member can be tilted to either the full line position shown in Fig. 2 or the dotted line position shown in said figure.

As will be seen, when in the full line position, grease scraped from the range top will drop upon the member 7 and thus enter the trough 1 but when the member 7 is moved to the dotted line position, the grease dropping from the top will be directed by the member 7 into the trough 2. Thus by simply changing the position of the member 7, the grease can be made to enter either trough and thus one kind of grease can be easily separated from another kind.

Figure 2:
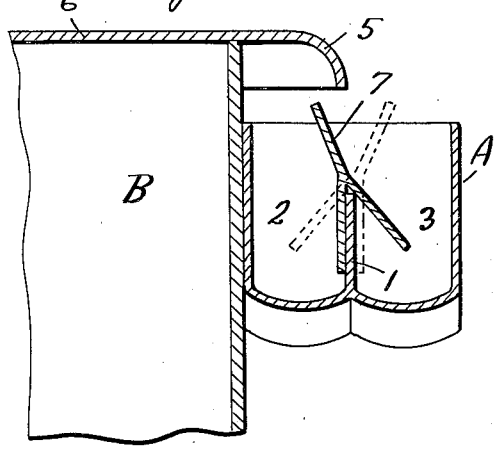
Fig. 2 is a section on line 2—2 of Fig. 1.
Figure 4:
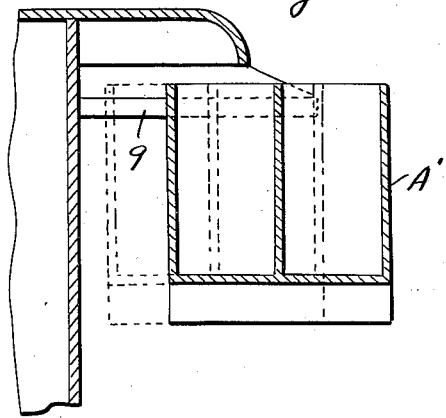
Fig. 4 is a section on line 4—4 of Fig. 3.
Figure 3:
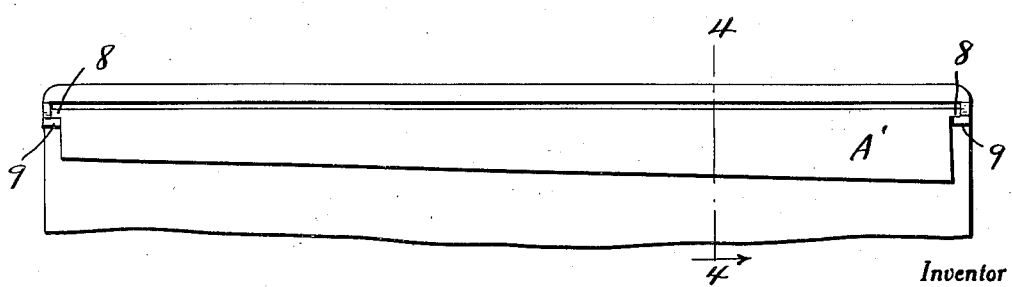
Fig. 3 is a view similar to Fig. 1 but showing a modification.

Instead of using the deflector member 7 as shown in Figs. 1 and 2, the double trough A' can be adjustably supported from the range by having its ends formed with the projections 8 for slidingly engaging the bars 9 projecting from the range, as shown in Figs. 3 and 4. In this arrangement, the double trough is moved in and out so as to place the desired trough under the overhanging part 5 of the top of the range, as shown in full and dotted lines in Fig. 4. Thus when one kind of grease is to be placed in one trough, the double trough is adjusted so that this particular trough will receive the grease from the range top and when another kind of grease is to be placed in the other trough, the double trough is adjusted to place said other trough in grease receiving position.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In combination with a cooking stove, a trough of elongated form, means for supporting the trough at one side of the stove adjacent an edge of the top thereof, a longitudinally extending partition in the trough dividing the same into two longitudinally extending compartments, the partition having its upper edge terminating an appreciable distance below the top of the trough, and a diverter including an upper flat part and a pair of downwardly diverging lower flat parts, said diverging parts having their upper portions engaging the upper edge of the partition, with the inner face of one diverging part resting against a side face of the partition when the diverter is tilted in one direction and the inner face of the other diverging part engaging the other face of the partition when the diverter is tilted in the opposite direction, said diverter acting to direct the grease from the stove top into one compartment or the other according to the tilted position of the diverter.

STUART D. WILSON.